(12) United States Patent
Oliveira Filho et al.

(10) Patent No.: US 11,583,787 B2
(45) Date of Patent: Feb. 21, 2023

(54) DEMULSIFIERS AND A METHOD OF USING DEMULSIFIERS FOR BREAKING EMULSIONS OF WATER AND CRUDE OIL

(71) Applicants: Clariant International Ltd., Muttenz (CH); Clariant S.A., Sao Paulo - Brazil (BR)

(72) Inventors: Antonio Pedro de Oliveira Filho, The Woodlands, TX (US); Carlos Augusto Blasques Tooge, Sao Paulo (BR); Thiago Nogueira, Lagoa (BR); Everton Basso, Rio das Ostras (BR); Sergio Costa Da Silva, Campos dos Goytacazes (BR); Carlos Alberto Magaton, Suzano (BR); Matthias Krull, Harxheim (DE)

(73) Assignee: CLARIANT INTERNATIONAL LTD, Muttenz (CH)

( * ) Notice: Subject to any disclaimer, the term of this patent is extended or adjusted under 35 U.S.C. 154(b) by 0 days.

(21) Appl. No.: 16/632,075

(22) PCT Filed: May 16, 2018

(86) PCT No.: PCT/EP2018/062764
§ 371 (c)(1),
(2) Date: Jan. 17, 2020

(87) PCT Pub. No.: WO2019/015828
PCT Pub. Date: Jan. 24, 2019

(65) Prior Publication Data
US 2020/0230523 A1     Jul. 23, 2020

(30) Foreign Application Priority Data
Jul. 20, 2017 (EP) .................... 17182331

(51) Int. Cl.
| | | |
|---|---|---|
| B01D 17/04 | (2006.01) | |
| C10G 33/04 | (2006.01) | |
| C09K 8/584 | (2006.01) | |
| C09K 8/588 | (2006.01) | |

(52) U.S. Cl.
CPC ............ *B01D 17/047* (2013.01); *C09K 8/584* (2013.01); *C09K 8/588* (2013.01); *C10G 33/04* (2013.01)

(58) Field of Classification Search
CPC .................. B01D 17/047; C10G 33/04; C09K 8/584–588
See application file for complete search history.

(56) References Cited

U.S. PATENT DOCUMENTS

| | | |
|---|---|---|
| 3,928,194 A | 12/1975 | Tao |
| 4,309,306 A | 1/1982 | Blair, Jr. |
| 4,551,239 A | 11/1985 | Merchant |
| 5,256,305 A | 10/1993 | Hart |
| 6,294,093 B1 * | 9/2001 | Selvarajan .......... B01D 17/0202 210/708 |
| 7,775,704 B2 | 8/2010 | Dahms |
| 3,047,702 A1 | 11/2011 | Lopresti |
| 8,622,607 B2 | 1/2014 | Braeker |
| 2003/0261227 A1 * | 2/2003 | Spalding .............. B01D 17/047 516/113 |
| 2013/0261227 A1 * | 10/2013 | Nguyen ................. C10G 31/08 523/403 |
| 2016/0008743 A1 | 1/2016 | Mortensen |
| 2016/0122622 A1 * | 5/2016 | Dwarakanath ......... C09K 8/588 507/225 |
| 2016/0244678 A1 | 8/2016 | Nguyen |

FOREIGN PATENT DOCUMENTS

| | | |
|---|---|---|
| CN | 1807557 | 7/2006 |
| CN | 101693846 | 4/2010 |
| DE | 1082576 | 6/1960 |
| EP | 2394804 | 12/2011 |
| GB | 2167468 | 5/1986 |
| WO | 9635040 | 11/1996 |
| WO | 2013158989 | 10/2013 |

OTHER PUBLICATIONS

International Search Report for PCT/EP2018/062764, dated Jun. 13, 2018, 3 pages.
M. H. Pahl and E. Muschelknautz, Chem.-Ing.-Tech., vol. 51 (1979), pp. 347 to 364.
Machine translation of DE1082576, Jun. 2, 1960. 3 pages.

* cited by examiner

*Primary Examiner* — Renee Robinson
(74) *Attorney, Agent, or Firm* — Tod A. Waldrop

(57) ABSTRACT

This invention provides a concentrated demulsifier composition comprising
A) at least 50 wt.-% of a demulsifier, selected from the group consisting of a polymeric nonionic oil-soluble demulsifier for mineral oils, and an alkyl aryl sulphonic acid or its salt, and mixtures thereof,
B) 0.1 to 20 wt.-% of a surfactant selected form anionic, cationic, zwitterionic and nonionic surfactants, the surfactant being different from the demulsifier,
C) less than 20 wt.-% of a water-immiscible organic solvent,
D) 3 to 49 wt.-% of a water-miscible organic solvent and
E) 0 to 5 wt.-% of water.

23 Claims, No Drawings

DEMULSIFIERS AND A METHOD OF USING DEMULSIFIERS FOR BREAKING EMULSIONS OF WATER AND CRUDE OIL

This invention relates to a novel composition and to a method of using such composition for breaking emulsions of water and oil. More specifically, the invention concerns a concentrate comprising an oil-soluble demulsifier, a surfactant and a stabilizing agent. In-situ dispersion of this concentrate in an aqueous carrier fluid allows for handling of small additive volumes on site while obtaining improved separation results. The invention has particular relevance to the application of crude oil demulsifiers at remote locations.

Crude oil produced from geological formations is seldom produced alone because it generally is commingled with various amounts of water. The water may stem from the formation or from introduction in the course of drilling, completion, stimulation and/or workover operations. Although water and crude oil are essentially non-miscible the aggregation of naturally occurring interfacial active compounds on the water/oil interface may cause water to form droplets within the bulk oil phase. Typical interfacial active compounds present in crude oil are for example asphaltenes and resins. During crude oil production the mixture of water and oil encounters a high input of mixing energy from rapid flow through production tubing and especially through its chokes and bends. This mixing energy most often leads to emulsification of the water and oil which is commonly referred to as a crude oil emulsion and which can be quite stable.

The presence of water in crude oil, however, is unwanted. Crude oil emulsions are often highly viscous and gel like and can create high pressure drops in the formation as well as in flow lines. Additionally, the presence of water reduces the capacity of pipelines and shipping vessels. The emulsified water can also contain various amounts of salts. These salts are detrimental to the integrity of pipelines and to crude oil refining equipment due to potential corrosion. Especially in downstream processing facilities as for example in refineries prevention of corrosion and catalyst poisoning are major concerns. In order to meet crude specifications for transportation, storage and shipping crude oil emulsions must be treated to remove the dispersed water and associated inorganic salts. The crude oil that is to be shipped out of the oilfield should be practically free of water and usually has a maximum water content limit of about 0.5 to 3% by total weight, depending on the type of crude and oil company.

In crude oil refining, desalting techniques comprise the deliberate mixing of the incoming crude oil with a fresh "wash water" to further extract the water soluble salts and hydrophilic solids from the crude oil prior to distillation. Quite often emulsion-breaking chemicals are added to the separation processes to assist and promote rapid water oil separations.

Both physical and chemical methods have successfully been applied to break crude oil emulsions and to speed up the separation of water. Common physical methods include heating to lower the viscosity of the oil phase, application of electrostatic fields to promote coalescence of the water droplets, and reduction of the flow velocity to allow for gravitational separation of oil, water and gas. Chemical agents typically act on the interfacial film by either reacting chemically with the polar crude oil components, e.g. by adjustment of pH, or by modification of the boundary phase of the dispersed droplets by weakening the stabilizing films and enhancement of droplet coalescence (demulsification). Such interfacial-active demulsifiers are the preferred chemicals due to lower addition rates needed. Often different methods are combined. A common method of emulsion treatment is the application of heat and an appropriate chemical demulsifier to promote destabilization, followed by a settling time with electrostatic grids to promote gravitational separation.

Commonly used emulsion-breaking chemicals ("demulsifiers") are polymeric nonionic surfactants as for example polyalkylene glycols, alkoxylated alcohols, alkoxylated alkyl phenols, alkyoxylated amines, alkoxylated alkylphenol formaldehyde resins, and the like. A further group of demulsifiers are organic sulfonates. Typically demulsifiers are highly viscous polymers and only sparingly soluble in water. To reduce their viscosity and to make them useable commercial demulsifier products are usually formulated in large volumes of organic, preferably aromatic solvents. This dilution also facilitates their dispersion in the oil phase and their spreading at the oil/water interface and consequently improves their performance.

A common practice to apply demulsifiers is to inject the demulsifier diluted with sufficient quantities of a diluent, generally an organic solvent, into the crude oil emulsion. Mixers may be installed to ensure proper mixing of the demulsifier with the crude oil emulsion. Upon standing, optionally at elevated temperature, the emulsion is subjected to gravitational separation into oil and water phase. For application of demulsifiers downhole directly in the subterranean oil or gas well, injection well, or the like large amounts of solvent are required in order to reliably and continuously deliver the additive thousand feet down to the well.

Among the disadvantages of having organic solvents in a demulsifier formulation are increased cost, toxicity and high volumes to be transported to the location of use. As an alternative, breaking of crude oil emulsions by use of aqueous formulations of oil-soluble demulsifiers dispersed in water has been proposed.

U.S. Pat. No. 4,309,306 discloses a homogeneous, micellar solution of a water-insoluble thin film spreading agent, comprising:
(a) from between about 5% and about 75% by weight of resinous polyalkylene oxide adducts;
(b) from between about 2% and about 30% by weight of a hydrotropic agent;
(c) from between about 2% and about 30% by weight of an amphipathic agent; and
(d) from between about 15% and about 90% by weight of water, for breaking or preventing petroleum emulsions. The exemplified formulations contain 16 to 35 wt.-% of a resinous polyalkylene oxide adduct and 34 to 52 wt.-% water.

GB-A-2167468 teaches well stimulation processes wherein an aqueous system is introduced into a hydrocarbon bearing underground formation to increase its rate of oil and/or gas production subsequent to the stimulation are improved by the incorporation into said system of a non-emulsifying agent and a cationic organic polymer whereby the formation exposed to said system is water-wet.

US-2016/0122622 teaches embodiments of a polymer composition for use in enhancing the production of oil from a formation. In one embodiment, the composition includes a powder polymer having an average molecular weight of 0.5 to 30 Million Daltons suspended in a water soluble solvent having an HLB of greater than or equal to 8 and selected from the group of surfactants, glycol ethers, alcohols, co-solvents, and mixtures thereof, at a weight ratio of powder polymer to water soluble solvent ranging from 20:80 to 80:20. The polymer composition is substantially anhydrous. The polymer composition is hydrated in an aqueous fluid for an injection solution in less than or equal to 4 hours containing a polymer concentration ranging from 100 ppm to 50,000 ppm and having a filter ratio of less than or equal to 1.5 to 15 psi using a 1.2 µm filter.

U.S. Pat. No. 5,256,305 discloses a method of breaking the emulsion in a crude oil desalting system in which the performance of oil based demulsifiers is compared when added to the oil respectively to the wash water stream and allowed to mix prior to contacting the crude oil. When added to the water phase breaking of the emulsion is effective only for crude oils which form reverse (oil-in-water) emulsions when mixed with the wash water at the process temperature. The presence of a surfactant is not disclosed. However, the poor solubility of the oil-based demulsifiers in water leads to creaming of the additive and poor respectively strongly fluctuating performance.

WO-96/35040 discloses a wellbore treatment concentrate which forms an aqueous well treatment composition when mixed with water comprising a demulsifying agent comprising a nonionic surface active agent and optionally a stabilizing agent suitable for stabilizing said concentrate as an aqueous emulsion. The wellbore treatment composition is prepared by diluting a wellbore treatment concentrate with water prior to use. The concentrate comprises about 1 to 10% of the demulsifying agent.

U.S. Pat. No. 6,294,093 discloses a process for demulsification of a water-in-oil, especially a water-in-crude oil, emulsion which is effected by contacting the emulsion with an aqueous composition having 10 to 50 wt.-% of at least one oil-soluble demulsifier and 0.2 to 8 wt.-% of at least one water-soluble surfactant, the balance being water. The compositions are free of organic solvents.

US-2003/0032683 discloses methods for preventing or resolving oil-in-water emulsions formed in aqueous brines used as completion fluids or workover fluids in wellbores. The demulsifying compositions applied may contain 1 to 40 wt.-% of a demulsifier, preferably a salt of a sulfonic acid, 1 to 80 wt.-% of a solubilizing surfactant, preferably a nonionic surfactant such as an alkoxylated alcohol and 40 to 95 wt.-% of a mutual organic solvent including water soluble glycol ethers, amides, ketones and alcohols. Exemplified is a blend of 92.5 wt.-% water soluble glycol ether, 2.5 wt.-% ethoxylated fatty acid and 5.0 wt.-% amine salt of alkyl aryl sulfonic acid.

WO-2013/158989 discloses a microemulsion-based demulsifier composition for resolving hydrocarbon emulsions encountered in crude oil production, refining and chemical processing, containing 2 to 30 wt.-% of a nonionic demulsifier dispersed in water containing 5 to 40 wt.-% of a coupling agent including water-soluble organic solvents in the presence of 2 to 25 wt.-% of a nonionic surfactant and 2 to 20 wt.-% of further surface active compounds. Exemplified are formulations containing 7 resp. 9 wt.-% demulsifier and 38 resp. 40 wt.-% water Due to the proceeding depletion of crude oil resources oil companies are forced to exploit crude oil reservoirs at more and more remote locations. Such oil fields are partly onshore, for example in the desert or in arctic regions, as well as offshore. In both cases supply of additives needed to facilitate crude oil production to the wellbore becomes an increasing logistic effort. For example, in offshore operations the transport of the additives to the platform can reach up to 20% of the total cost of the additive. Furthermore, the transportation causes a noticeable carbon footprint. Additionally, there is a continuous strive for more efficient additives and/or methods for breaking emulsions of water and crude oil. This includes the desire for additives which achieve the necessary degree of separation at lower temperatures respectively with shorter residence times and/or with lower quantities of additives in order to reduce the logistic efforts and cost. Aqueous formulations of additives have advantages in respect to ecological and safety aspects but their volumes to be handled are similarly high and they often pose problems when they have to be handled at temperatures below 0° C. and especially below −10° C. unless adequate precautionary measures have been taken.

Accordingly, there is a need for more economical and more environmentally friendly demulsifiers and methods to apply such products for breaking of oil and especially for breaking of crude oil emulsions. It would be desirable if the amount of solvents, organic as well as water, contained in currently applied concentrates could be reduced in order to minimize the volume of additives to be transported to the oil field. Handling of the additives shall be easy even under harsh climatic conditions. Simultaneously, there is a need for more efficient methods for breaking of emulsions of water and oil and especially for breaking of water-in-oil emulsions and complex emulsions containing a water-in-oil emulsion. Concomitantly the efficiency of the active components and/or the methods of their application shall equal or, if possible, exceed the performance of the formulations according to the state of the art. This includes faster separation rates, as well as improved separation efficiency at lower temperatures, a lower content of water in the crude oil, a lower content of salt in the crude oil and/or a lower content of oil in the separated water to be disposed. Last but not least the hazard of the solvent, if needed, shall be as low as possible.

Unexpectedly it was found that demulsifier compositions comprising a major amount of an oil-soluble nonionic polymeric surfactant as the demulsifier and a minor amount of surfactant formulated in a water-miscible organic solvent can be stably dispersed in water to produce aqueous dispersions having a superior performance in the breaking of emulsions of water and oil and especially of water-in-oil emulsions in comparison to their formulation in aromatic solvents. A higher concentration of the demulsifier in the composition and a higher efficiency of the active material due to its mode of application both reduce the total amount of product necessary to treat a barrel of crude oil. Consequently less space for storage of the demulsifier is required which is especially advantageous in locations with constricted space as for example on platforms and/or flooding production storage offloading (FPSO) facilities. The concentrated demulsifier compositions are especially advantageous when blended and mixed with water on-the-fly prior to mixing into the emulsion to be broken. Such concentrated demulsifier compositions and their method of application allow the shipping of only small volumes of a concentrated demulsifier composition to a remote oil field onshore as well as offshore thereby reducing the expenditure for supply chain and the carbon footprint. Dispersed in water the concentrated demulsifier compositions show an efficiency superior to the respective concentrated formulations. Furthermore the dispersed demulsifiers allow demulsification at lower temperatures than the concentrates.

In a first aspect the invention provides a concentrated demulsifier composition comprising
A) at least 50 wt.-% of a polymeric oil-soluble demulsifier for mineral oils,
B) 0.1 to 20 wt.-% of a surfactant selected form anionic, cationic, zwitterionic and nonionic surfactants, the surfactant being different from the demulsifier, C) less than 20 wt.-% of a water-immiscible organic solvent,
D) 3 to 49 wt.-% of a water-miscible organic solvent and
E) between 0 and 5 wt.-% water.

In a second aspect the invention provides an aqueous dispersion of a demulsifier containing 0.1 to 5 wt.-% of the concentrated demulsifier composition according to the first aspect of the invention.

In a third aspect the invention provides a process for breaking of an emulsion of oil and water comprising
i) in-situ preparation of an aqueous dispersion of the concentrated demulsifier composition according to the first aspect of the invention in an aqueous fluid and
ii) mixing the aqueous dispersion with an emulsion of oil and water,
wherein the aqueous dispersion contains 0.1 to 7 wt.-% of the concentrated emulsifier according to the first aspect of the invention.

In a fourth aspect the invention provides the use of a concentrated demulsifier composition for resolving an emulsion of water and oil, comprising the steps of:
a) continuously dosing 0.1 to 7 wt.-% of a concentrated demulsifier composition according to the first aspect of the invention into a stream of aqueous fluid,
b) in-line mixing of the stream of aqueous fluid containing the concentrated demulsifier composition according to the first aspect of the invention and the aqueous fluid downstream from the point of addition of the concentrate to obtain a dispersion of the demulsifier in the aqueous fluid,
c) mixing of 0.01 to 3.5 wt.-% of the stream of aqueous fluid containing the dispersed concentrated demulsifier composition with an emulsion of water and oil,
d) coalescing water droplets from the emulsion and
e) separating the oil phase from the water phase.

The concentrated demulsifier compositions according to the first aspect of the invention are essentially free of water. The concentrates contain less than 5 wt.-% water, more preferred between 0.1 and 2.5 and especially between 0.5 and 1 wt.-% as for example less than 2.5 wt.-% or less than 1 wt.-% or between 0.1 and 5 wt.-%, between 0.1 and 1 wt.-%, between 0.5 and 5 wt.-% or between 0.5 and 2.5 wt.-% of water.

Demulsifiers (A)

Polymeric oil-soluble demulsifiers (A) for mineral oils are understood to mean all those additives which facilitate the separation of water from emulsions of water and oil and especially from emulsions of water and crude oil. Preferred demulsifiers are polymeric nonionic surfactants. The demulsifier may be a single demulsifier, or a combination or blend of more than one demulsifier. The selection of the best suited demulsifier to be used, as well as whether to use a single demulsifier or a blend will depend upon the particular emulsion to be treated.

Preferred polymeric oil-soluble demulsifiers (A) are polymeric oil-soluble, nonionic surfactants. Such demulsifiers are well known in the art, and include, for example, polyoxyalkylated alkyl phenols, polyoxyalkylated alkyl phenol resins, polyoxyalkylated alkanols, polyoxyalkylated polyols, polyoxyalkylated alkyl amines, polyoxyalkylated polymeric amines, polyglycol resin esters, glycol esters and polyoxyalkylated glycol esters. These polymers may be further crosslinked with for example aldehydes, diglycidyl ethers including Bisphenol A diglycidyl ether, di-isocyanates, polycarboxylic acids and combinations thereof. This enumeration is, of course, not exhaustive and other demulsifying agents or mixtures thereof will occur to one skilled in the art. Preferred demulsifiers are only sparingly soluble in water. Sparingly soluble means that their solubility is preferably less than 10 g/L and especially less than 1 g/L. Preferred polymeric oil-soluble demulsifiers (A) are viscous liquids with negligible or even no crystallinity.

Preferred alkyl groups in the demulsifiers include $C_1$-$C_{30}$ alkyl groups which may be straight chain or branched as for example t-butyl, t-amyl, di-t-butyl, n-nonyl, tri isopropyl, tetra isopropyl, penta isopropyl. They are usually introduced via the raw materials used for the preparation of the demulsifier as for example by alkyl phenols, alkyl phenol resins, alkanols, and/or alkyl amines. Preferred polyols include diols, triols, tetrols and sorbitols. Preferred alkylene oxides for the preparation of demulsifiers are ethylene oxide, propylene oxide, butylene oxide and their mixtures. In preferred demulsifiers containing mixtures of alkylene oxides the different alkylene oxides can be distributed statistically, in blocks or contain a mixture of both distributions. Examples for especially preferred demulsifiers include polyalkoxylated alkyl phenolic resin adducts and polyalkylene glycols.

In a preferred embodiment, the polymeric oil-soluble demulsifier contains a polyoxalkylated phenolic resin according to the formula (1)

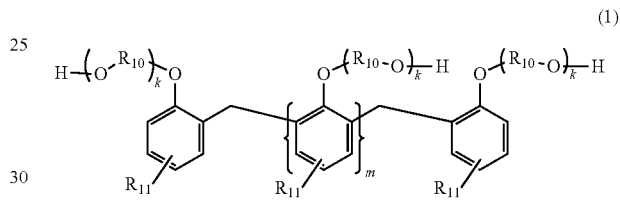

(1)

wherein
$R^{10}$ is $C_2$ to $C_4$ alkylene
$R^{11}$ is $C_1$ to $C_{18}$ alkyl
k is a number from 1 to 200
m is a number from 1 to 100

In a preferred embodiment $R^{10}$ is an ethylene or a propylene group. In another preferred embodiment, $R^{11}$ is a $C_4$ to $C_{12}$ alkyl group, more preferably a tertiary butyl group or an iso-nonyl group or a mixture of both. In formula (1), $R^{10}$, $R^{11}$ and k may be the same in each of the repeating units, or they may differ from unit to unit. In a further preferred embodiment k is an integer from 1 to 20. In a further preferred embodiment, m is an integer from 3 to 20.

In a preferred embodiment the polymeric oil-soluble demulsifier additionally contains an alkylaryl sulfonic acid and/or its salt. Especially preferred sulfonic acids are alkyl aryl sulfonic acids of formula (2)

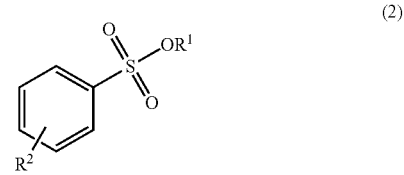

(2)

wherein
$R^1$ is selected from hydrogen, alkali metals, alkaline earth metals, ammonium and N-alkyl ammonium salts.
$R^2$ is a linear or branched alkyl residue with 1 two 20 carbon atoms.

Preferred alkylammonium salts of alkyl aryl sulfonic acids (2) are derived from alkyl amines carrying one to three alkyl residues with independently 1 to 6 carbon atoms, optionally being substituted with a hydroxyl group. Preferred alkyl aryl sulfonic acid is dodecyl benzyl sulfonic acid and its salts with sodium, potassium and ammonium.

When an alkyl aryl sulfonic acid is present it constitutes part of the polymeric oil-soluble demulsifiers (A). The weight ratio between alkyl aryl sulfonic acid and the polymeric nonionic surfactant is preferably between 5:1 and 1:10 and especially between 2:1 and 1:5, as for example between 5:1 and 1:5 or between 2:1 and 1:10.

Breaking of emulsions with a demulsifier requires a properly selected/optimized chemical for the given emulsion of water and oil. Often formulations containing two or more as for example three, four, five or more components are applied. Usually the portion of the individual components in the entity of components is between 1 and 99 wt.-% and especially between 10 and 90 wt.-% as for example between 1 and 90 wt.-% or between 10 and 99 wt.-%.

In a preferred embodiment the concentrate according to the first aspect of the invention contains between 50 and 94 wt.-%, more preferred between 65 and 93 wt.-%, especially preferred between 76 and 92 wt.-% and especially between 80 and 90 wt.-% as for example at least 65 wt.-% or at least 76 wt.-% or at least 80 wt.-% or between 50 and 93 wt.-%, between 50 and 92 wt.-%, between 50 and 90 wt.-%, between 65 and 94 wt.-%, between 65 and 92 wt.-%, between 65 and 90 wt.-%, between 76 and 94 wt.-%, between 76 and 93 wt.-%, between 76 and 90 wt.-%, between 80 and 94 wt.-%, between 80 and 93 wt.-% or between 80 and 92 wt.-% of the polymeric oil-soluble demulsifier (A).

Surfactant (B)

Surfactants (B) preferred as a component in the concentrated demulsifier composition are selected from anionic, cationic, zwitterionic and nonionic emulsifiers. Besides the anionic, cationic, zwitterionic or nonionic polar head group which imparts water solubility preferred surfactants (B) contain a lipophilic part comprising a hydrocarbyl residue with 8 to 30 and especially 10 to 22 as for example with 8 to 22 or 10 to 30 carbon atoms. The hydrocarbyl residue may be aliphatic, aromatic or alkyl aromatic. Alkyl groups as part of the surfactant (B) include linear, cyclic, saturated and unsaturated residues. Preferred surfactants (B) have a hydrophilic-lipophilic balance (HLB value) of at least 7, more preferably of at least 9 and especially of more than 10. The HLB value may be calculated according to Davies (Gas/Liquid and Liquid/Liquid Interfaces. Proceedings of 2$^{nd}$ International Congress Surface Activity, Butterworths, London 1957). Preferred surfactants are water soluble or water-dispersible. Water solubility or water-dispersibility is assumed if the HLB value is 7 or more, preferably 9 or more and particularly is more than 10.

Anionic emulsifiers contain a lipophilic radical and a polar head group, which bears an anionic group, for example a carboxylate, sulfonate, phosphonate or phenoxide group. Typical anionic emulsifiers include, for example, salts of fatty acids having a saturated or unsaturated hydrocarbon radical having 8 to 24 carbon atoms. The hydrocarbon radical may be linear, branched or cyclic, preferably it is linear. Preferred salts are the alkali metal, alkaline earth metal and ammonium salts, for example sodium palmitate, potassium oleate, ammonium stearate, diethanolammonium talloate and triethanolammonium cocoate. Particularly preferred emulsifiers are salts of fatty acids having 12 to 20 carbon atoms and especially of unsaturated fatty acids having 12 to 20 carbon atoms, for example oleic acid, linoleic acid and/or linolenic acid, with alkali metal, ammonium and especially alkanolammonium ions. In a specific embodiment, mixtures of salts of cyclic carboxylic acids and unsaturated linear fatty acids are used. Further suitable anionic emulsifiers are polymeric anionic surfactants, for example based on neutralized copolymers of alkyl (meth) acrylates and (meth)acrylic acid, and neutralized partial esters of styrene-maleic acid copolymers. Also suitable as anionic emulsifiers are sulfates of alkoxylated fatty alcohols, alkylphenols and sulfosuccinates, and especially the alkali metal, alkaline earth metal, ammonium and alkylammonium salts thereof.

Cationic emulsifiers contain a lipophilic radical and a polar head group which bears a cationic group. Typical cationic emulsifiers are salts of long-chain primary, secondary or tertiary amines of natural or synthetic origin carrying at least one alkyl residue with 8 to 20 carbon atoms. Also suitable as cationic emulsifiers are quaternary ammonium salts, for example tetraalkylammonium salts and imidazolinium salts derived from tallow fat.

Zwitterionic emulsifiers are understood to mean amphiphiles whose polar head group bears both an anionic site and a cationic site which are joined to one another via covalent bonds. Typical zwitterionic coemulsifers include, for example, N-alkyl N-oxides, N-alkyl betaines and N-alkyl sulfobetaines.

Nonionic emulsifiers contain a lipophilic radical and a polar head group which is electroneutral, for example a hydroxyl and/or ether group. Preferred nonionic surfactants (B) have a hydrophilic-lipophilic balance (HLB value) of at least 7 and preferably between 7 and 20, more preferably between 9 and 18 and especially between more than 10 and 16 as for example between 7 and 18, between 7 and 16, between 9 and 20, between 9 and 16, between more than 10 and 20 or between more than 10 and 18.

Typical nonionic emulsifiers are, for example, oxyalkylated $C_8$- to $C_{20}$-alkanols, $C_8$- to $C_{12}$-alkylphenols, $C_8$- to $C_{20}$-fatty acids or $C_8$- to $C_{20}$-fatty acid amides containing preferably 5 to 80 and especially 10 to 50 as for example 5 to 50 or 10 to 80 recurring units derived from one or more alkylene oxides. Preferred alkylene oxide is ethylene oxide. Further suitable examples of nonionic emulsifiers are poly (alkylene oxides) in the form of block copolymers of different alkylene oxides such as ethylene oxide and propylene oxide, and partial esters, partial ethers and partial ether/esters of polyols or alkanolamines with fatty acids. Especially preferred nonionic surfactants (B) are alkoxylated alcohols, alkoxylated fatty acids, alkoxylated alkyl phenols, partial esters of ethoxylated polyols including fatty acid esters of polyoxyethylated sorbitan and partial esters, ethers and amides of polyols including alkylpolyglycosides and N-acylated N-alkyl glucamines.

Especially preferred N-acylated N-alkyl glucamines include structures with linear head groups according to structure (3) as well as structures with cyclic head groups according to structure (4)

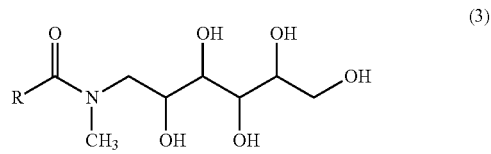

(3)

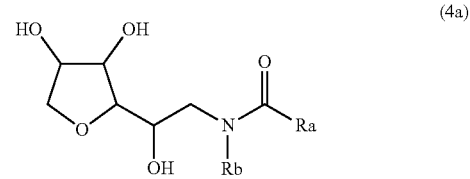

(4a)

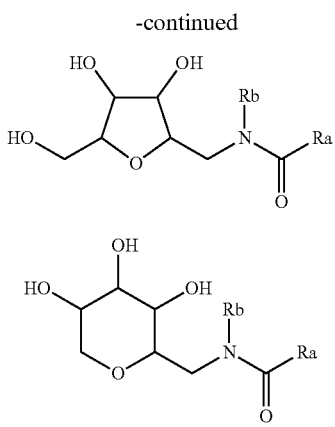

wherein
R, Ra are independently a $C_5$ to $C_{29}$ aliphatic hydrocarbyl group and
Rb is a $C_1$ to $C_6$ aliphatic hydrocarbyl group.

The portion of surfactant (B) in the concentrated demulsifier composition is such that the surfactant will generate and stabilize a dispersion when the concentrate is mixed with water. Usually its portion in the concentrated demulsifier composition is between 0.1 and 20 wt.-%, preferably between 0.5 and 10 wt.-% and especially between 1 and 7 wt.-% as for example between 0.1 and 10 wt.-%, between 0.1 and 7 wt.-%, between 0.5 and 20 wt.-%, between 0.5 and 7 wt.-%, between 1 and 20 wt.-% or between 0.1 and 10 wt.-%.

Water-Miscible Organic Solvent (D)

Suitable water-miscible organic solvents (D) are liquids at ambient temperature and pressure, i.e. at 25° C. and 1 atm. Water-miscible means that they are at least miscible with water to the extent which is introduced by the concentrated demulsifier composition into the aqueous fluid. Preferred organic solvents (D) have boiling points above 50° C. and especially above 70° C. Preferred water-miscible organic solvents (D) possess a high polarity and have a dielectric constant of at least 10 and especially at least 12. Such solvents typically contain 10 to 80 wt.-% of heteroatoms such as oxygen and/or nitrogen. Particular preference is given to oxygen-containing solvents. Especially preferred water-miscible organic solvents (D) are selected from alcohols, glycols, glycol ethers, esters, amides, ketones and their mixtures. Especially preferred water-miscible organic solvents (D) have 1 to 6 carbon atoms and most preferred one, two, three or four carbon atoms.

Preferred alcohols have 1 to 6 carbon atoms and 1 to 4 hydroxyl groups, but not more than one hydroxyl group per carbon atom. Preferred alcohols are methanol, ethanol, n-propanol, iso-propanol, n-butanol, iso-butanol, tert.-butanol, the various isomes of pentanol and hexanol, ethylene glycol, propylene glycol, butylene glycol, neopentyl glycol and glycerol. Especially preferred are monohydric alcohols with 1 to 4 carbons atoms, for example methanol, ethanol, n-propanol, iso-propanol, n-butanol, iso-butanol and tert.-butanol Preferred water-miscible glycol ethers are dimers, trimers and oligomers of ethylene glycol and propylene glycol such as diethylene glycol, triethylene glycol, oligoethylene glycol, dipropylene glycol, tripropylene glycol and oligopropylene glycols. Oligoethylene glycols and oligopropylene glycols preferably have a number average molecular weight between 200 and 1,000 g/mol. Similarly suited are ethers of ethylene glycol or propylene glycol with lower alcohols having 1 to 3 carbon atoms, including but not limited to ethylene glycol monomethyl ether, ethylene glycol dimethyl ether, ethylene glycol monoethyl ether and ethylene glycol diethyl ether.

Preferred esters are ethyl acetate and 2-ethoxyethyl acetate. Preferred amides are acetamide, N,N-dimethyl formamide, acetamide and N,N-dimethyl acetamide, Preferred ketones are acetone, butanone and pentanone.

Particularly preferred water-miscible organic solvents (D) are methanol, ethanol, ethylene glycol and glycerol and mixtures containing these solvents. In a preferred embodiment the water-miscible concentrated demulsifier composition contains at least one monohydric alcohol. Preferably the water-miscible solvent contains more than 10 wt.-%, more preferably 20 to 90 wt.-% and especially 40 to 75 wt.-% as for example more than 20 wt-%, more than 40 wt.-% or 10 to 90 wt.-%, 10 to 75 wt.-%, 20 to 75 wt.-%, or 40 to 90 wt.-% of a monohydric alcohol. In a further preferred embodiment the water-miscible solvent is a monohydric alcohol.

The concentrated demulsifier composition contains between 3 and 49 wt.-%, preferably between 5 and 34 wt.-%, especially between 7 and 23 wt.-% and especially preferred between 10 and 19 wt.-% as for example between 3 and 34 wt.-%, between 3 and 23 wt.-%, between 5 and 49 wt.-%, between 5 and 23 wt.-%, between 5 and 19 wt.-%, between 7 and 49 wt.-%, between 7 and 34 wt.-%, between 7 and 19 wt.-%, between 10 and 49 wt.-%, between 10 and 34 wt.-% or between 10 and 23 wt.-% of at least one water-miscible organic solvents (D).

Water-Immiscible Organic Solvent (C)

The water-immiscible organic solvent (C) is an optional component. In order to reduce the viscosity of the demulsifier (A) the presence of a small amount of a water-immiscible solvent often has proven to facilitate dispersion of the concentrated demulsifier composition in the aqueous fluid and to support the performance in breaking of emulsions of water and oil.

Particularly useful water-immiscible organic solvents (C) are aliphatic, aromatic and alkylaromatic hydrocarbons and mixtures thereof. The demulsifiers (A) usable in accordance with the invention are at least partially soluble in these solvents at least to an extent of 20% by weight at 50° C. Preferred solvents do not contain any polar groups in the molecule. In order to minimize apparatus complexity their boiling point is preferably above the operating temperature, for example above 60° C. and preferably above 80° C. as for example between 80 and 200° C. under standard conditions. Examples of suitable solvents are decane, toluene, ethylbenzene, xylene, diethylbenzene, trimethylbenzene, naphthalene, tetralin, decalin, and commercial solvent mixtures such as Shellsol®, Exxsol®, Isopar®, Solvesso® types, Solvent Naphtha, aromatic naphtha and/or kerosene. In preferred embodiments, the water-immiscible solvent comprises at least 10% by weight, preferably 20 to 100% by weight, for example 30 to 90% by weight, of aromatic components.

The portion of the water-immiscible organic solvent (C) in the concentrated demulsifier composition is preferably between 0.1 and 20 wt.-%, more preferably between 0.5 and 10 wt.-% and especially between 1 and 5 wt.-% as for example below 10 wt.-%, below 1 wt.-%, below 5 wt.-% or between 0.1 and 10 wt.-%, between 0.1 and 5 wt.-%, between 0.5 and 20 wt.-%, between 0.5 and 5 wt.-%, between 1 and 20 wt.-% or between 1 and 10 wt.-%. If a water-immiscible organic solvent (C) is present in the concentrated demulsifier composition its amount is preferably less than 20 wt.-%, more preferably between 0.1 and 20 wt.-% and especially between 1 and 10 wt.-% of the amount of water-miscible organic solvent (D) present as for example less than 10 wt.-% or between 0.1 and 20 wt.-% or between 0.1 and 10 wt.-% of the amount of water-miscible organic solvent (D) present. In an especially preferred embodiment the concentrated demulsifier composition is void of a water-immiscible organic solvent (C).

Water (E)

Water is an optional component. Often water is introduced into the concentrated demulsifier composition by one or more of the components in minor amounts. Preferably the content of water in the concentrated demulsifier composition is below 3.0 wt.-%, more preferably between 0.01 and 3.0 wt.-% and especially between 0.1 and 1.0 wt.-% as for example below 1.0 wt.-%, or below 0.1 wt.-%, or below 0.01 wt.-% or between 0.01 and 5.0 wt.-%, or between 0.01 and 2.0 wt.-%, or between 0.01 and 1.0 wt.-%, or between 0.1 and 5.0 wt.-% or between 0.1 and 3.0 wt.-% or between 0.1 and 2.0 wt.-%. If water (E) is present in the concentrated demulsifier composition its content is preferably less than 20 wt.-%, more preferably between 0.1 and 10 wt.-% and especially preferred between 1 and 8 wt.-% of the amount of water-miscible organic solvent (D) present as for example less than 10 wt.-% or less than 8 wt.-% or between 0.1 and 20 wt.-% or between 0.1 and 8 wt.-% or between 1 and 20 wt.-% or between 1 and 10 wt.-% of the amount of water-miscible organic solvent (D) present.

The concentrated demulsifier compositions according to the invention preferably contains
A) 50 to 94% by weight of at least one demulsifier,
B) 0.1 to 20 wt.-% of a surfactant selected form anionic, cationic, zwitterionic and nonionic surfactants,
C) less than 20 wt.-% of an water-immiscible organic solvent
D) 5 to 49% by weight of at least one water-miscible solvent and
E) less than 5 wt.-% of water Dispersion in Aqueous Fluid For application of the concentrated demulsifier composition for breaking of an emulsion of oil and water the concentrated demulsifier composition is first mixed into an aqueous fluid to generate a dispersion of the demulsifier in water. Subsequently the aqueous dispersion of the demulsifier is mixed with the emulsion of oil and water. Suited aqueous fluids for the preparation of the dispersion include fresh water and different grades of brine, including tap water, brackish water, saline water and seawater as well as water produced with and separated from crude oil. Especially preferred is sea water. Sea water is understood to be water from a sea or ocean. On average sea water contains about 3.5 wt.-% of dissolved salts. However, depending on provenience the salt content may also be higher or lower.

Dispersions of demulsifiers according to the invention are fluids in which fine particles of a demulsifier are dispersed in an aqueous continuous liquid phase. Besides water, the continuous liquid phase contains at least the amount of water-miscible organic solvent (D) introduced by the concentrated demulsifier composition. In case of brine, seawater and the like it contains dissolved salts. Furthermore the aqueous fluid may contain additional water-miscible organic solvent like e.g. methanol, ethanol, ethylene glycol, propylene glycol or glycerol. When a water-miscible organic solvent is present it is part of the continuous phase jointly with water. In the dispersions according to the invention the demulsifier may be in liquid or solid state. Often the demulsifier is the neat active polymer but preferably it is a solution in the essentially water insoluble organic, preferably aromatic solvent (C).

For preparation of the dispersion the concentrated demulsifier composition is mixed with the aqueous fluid batch wise or in a continuous mode, optionally with heating. Often simple stirring is sufficient for dispersing the concentrate demulsifier in the aqueous fluid.

In a preferred embodiment, the concentrated demulsifier composition is dispersed in the aqueous fluid, optionally while heating one or both components. Preference is given to working at temperatures between the melting point of the polymeric oil-soluble demulsifier (A) and the boiling point of the solvent. Especially preferred are temperatures between 20 and 110° C. Before their addition to the dispersion process the temperature of the aqueous fluid and the concentrated demulsifier composition may be the same or different.

The amount of concentrated demulsifier composition added to the aqueous phase is between 0.1 and 7 wt.-%, preferably between 0.2 and 5 wt.-% and especially between 0.3 and 2.5 wt.-% as for example between 0.1 and 5 wt.-%, between 0.1 and 2.5 wt.-%, between 0.2 and 7 wt.-%, between 0.2 and 2.5 wt.-%, between 0.3 and 7 wt.-% or between 0.3 and 5 wt.-% in respect to the aqueous phase. Preferably the dispersions contain at 0.1 to 5 wt.-%, more preferably 0.2 to 3 wt.-%, and especially between 0.5 and 2.5 wt.-% as for example between 0.1 and 3 wt.-%, between 0.1 and 2.5 wt.-%, between 0.2 and 5 wt.-%, between 0.2 and 2.5, between 0.5 and 5 wt.-% or between 0.5 and 3 wt.-% of dispersed demulsifier.

Dispersion of the concentrated demulsifier composition can be accomplished in batch or continuous mode. At remote locations a continuous mode of dispersion has proven to be less complex and therefore to be advantageous. In a preferred embodiment dispersion of the concentrated demulsifier composition in the aqueous phase is supported and especially speeded up by intense mixing. This delivers smaller particle sizes, improves the stability of the dispersion and provides better performance. Dynamic as well as static mixers are suited for dispersing the concentrated demulsifier composition and especially for dispersing it in a continuous mode. Preferably the mixture of the concentrated demulsifier composition and the aqueous phase is exposed to high shear rates of at least $10^3$ $s^{-1}$ and preferably of at least $10^5$ $s^{-1}$, as for example of at least $10^6$ $s^{-1}$.

In a first preferred embodiment the dispersion is effected by a dynamic mixer. Preferred dynamic mixers are selected from high shear dispersers, high-pressure homogenizers, high shear homogenizers and microjet reactors and include impellers, special agitators/blenders, mills, rotor-stator dispersers and integral pump mixers.

The most common dynamic mixers are rotor-stator dispersers which are also called high-shear mixers. By placing a closely fitting shroud around a high-speed impeller, a shearing action between the blades and stator shroud is created. As the material to be dispersed is centrifugally pumped through the mixing head, it experiences shear stressing that results in dispersive mixing. The intense hydraulic shear causes excellent blending capability. Rotor-stator machines are flexible in their duties and are available for both batch and continuous applications. Suited shear rates can be obtained, for example, by means of toothed disk dispersers (e.g. Ultra-Turrax®), or high-pressure homogenizers with conventional or preferably angular channel architecture (Microfluidizer®). Suitable shear rates are also achievable by means of a Cavitron or by ultrasound.

Further examples of suited dynamic mixers have been described in the state of the art. For example, DE-A-1082576 discloses a counter flow mixing mechanism, in which stirring blades are arranged at an angle on supporting arms. The supporting arms are configured in a manner similar to a sword and are positioned at an angle to the axis of the stirring mechanism shaft in such a manner that the conveying direction of the supporting arm surface is opposed to the conveying direction of the stirring blades.

U.S. Pat. No. 7,775,704 discloses a device for continuously producing emulsions or dispersions while excluding air comprising a mixing vessel, which is closed on all sides and which has supply tubes and discharge tubes for introducing and discharging fluid substances or compositions, and also an impeller, which permits an agitating input into the emulsion or dispersion without generating cavitation forces and without high-pressure homogenization.

U.S. Pat. No. 8,047,702 discloses a high shear mixer in a holding tank operated in a continuous flow process. Flow rate of material into and out of the holding tank establishes residence time in contact with shearing elements. A batch shear mixer is used in a tank that has continuous flow into at the bottom and flow out at the top. The mixing chamber is sized for the maximum needed residence time, slowing the flow increases the residence time.

U.S. Pat. No. 8,622,607 discloses the use of known mixing and shearing tools which are fastened to a shaft, wherein the shaft is mounted rotatable in an at least partially cylindrical trough, and the mixing tools end at a very short distance from an inner surface of the trough and the shaft has driving means.

EP-A-2394804 discloses a high-shear melt-kneader including a high-shear unit having an internal feedback-type screw configured to apply high-shear stress to a melted resin.

US-A-2016/0008743 discloses a liquid processing mixer which comprises a mixing unit and a de-aeration vessel. The mixing unit is separated from the de-aeration vessel and in fluid connection with the de-aeration vessel, and the liquid processing mixer comprises at least one additive inlet arranged between the de-aeration vessel and a high shear mixing device of the mixing unit for introducing the additive downstream of the de-aeration vessel.

In a further preferred embodiment the dispersion is effected by a static mixer. Static mixers are devices located in a tubing having stationary internals which effect mixing of fluid product streams using flow energy. By intensifying the turbulences in the tube through which flow occurs, they reduce the zone required for attaining a sufficient standard of mixing. In preferred embodiments, they consist of a multiplicity of the same or different type of mixing elements which are installed in succession in a channel through which the product stream flows, individually or combined into groups, and offset by 90° relative to each other. The mixing elements should be configured in such a way that they spatially deflect and shear the product streams.

The choice of a suitable static mixer depends not least on the flow in the conveying tube: for instance, a laminar flow requires more intensive separation, rearrangements and backmixing of the stream than turbulent flow. The prior art includes a multiplicity of designs of static mixers which are suitable for the process according to the invention. With regard to the very different designs of static mixers, reference is made to the review in M. H. Pahl and E. Muschelknautz, Chem.-Ing.-Tech., volume 51 (1979), pages 347 to 364, and this disclosure is incorporated in the present application by way of reference.

Useful static mixers have proven to be, for example, Multiflux, Sulzer, PMR, McHugh, Komax and Honeycomb, X, Ross-ISG and helical mixers. Particular preference is given to helical mixers having helical element groups of from 2 to 200, preferably from 5 to 100 and especially from 10 to 50, mixing elements which effect complete radial mixing, for example Kenics mixers.

Preference is given to using the static mixer in a pipeline used for conveying the aqueous fluid combined with the concentrated demulsifier composition to the water separation vessel. Further additive components which are added to the aqueous phase in minor proportions, for example up to 10 vol.-%, preferably up to 5 vol.-% and especially up to 1 vol.-%, can also be added directly to the static mixer via an injection point. To attain a sufficient degree of mixing, preference is given to a relative mixer length L/D of from 2 to 50, in particular from 3 to 10, especially from 5 to 10, where L is the length and D is the diameter of the mixing zone.

Preference is given to the static mixer being dimensioned in such a way that the pressure drop over the mixing zone is less than 10 bar, in particular from 0.001 to 5 bar and especially from 0.05 to 1 bar. In the simplest case, the pressure used to convey the aqueous fluid is utilized for mixing. However, it is also possible to use pressure-increasing pumps.

Similarly suited is an injection mixing process wherein the concentrated demulsifier is injected into a stream of aqueous fluid with a high speed, high open area liquid jet via a jet pump as described for example in WO 99/43887.

Independent of the technique applied for dispersion of the concentrated demulsifier composition the temperature of the concentrated demulsifier composition to be mixed with and dispersed in water is preferably adjusted in such a way that its viscosity is below 5,000 mPas, preferably between 1 and 1,000 mPas and more preferably between 10 and 500 mPas. Depending on the concentrated demulsifier composition, these may be up to 120° C., generally from 10 to 100° C. The aqueous fluid can have a higher or lower temperature.

Similarly, to obtain a homogeneous dispersion, the time required for mixing is less than 60 seconds, preferably less than 30 seconds, in particular less than 15 seconds and especially less than 5 seconds. This corresponds substantially to the time which the components require to flow through the mixer and is faster by a factor of from 100 to 10,000 than in the case of batchwise mixing.

The temperature of the mixture at the outlet of the dynamic respectively the static mixer is preferably from 25 to 90° C., in particular from 30 to 85° C. The process according to the invention in principle does not require constant temperature. Preference is given to keeping the temperature constant at the outlet of the mixer during the mixing within ±10° C., in particular within ±5° C.

Immediately after its preparation the mean particle size of the aqueous dispersion as measured by dynamic light scattering (Z average) is preferably below 50 µm, more preferably between 0.001 and 20 µm and especially between 0.01 and 10 µm as for example between 0.001 and 50 µm, between 0.001 and 10 µm, between 0.01 and 50 µm, between 0.01 and 20 µm, between 0.001 and 5 µm or between 0.01 and 5 µm. In a preferred embodiment the particle size is below 1 µm as for example between 0.001 and 1 µm or between 0.01 and 1 µm.

Demulsification

Besides a properly selected/optimized demulsifier (A) the breaking of a given emulsion requires an adequate quantity of the demulsifier, adequate mixing of the dispersed demulsifier with the emulsion of water and oil and sufficient retention time in separators to settle water droplets. Preferably the separation is done at elevated temperatures e.g. at temperatures above 30° C., more preferably between 40° C. and 160° C. and especially between 50 and 150° C. as for example between 30 and 160° C., between 30 and 150° C., between 40 and 150° C. or between 50 and 160° C. The process is especially advantageous at temperatures below 90° C. and even below 80° C. as for example between 30 and 90° C., between 30 and 80° C., between 40 and 90° C., between 40 and 80° C. or between 40 and 90° C.

In a preferred embodiment the aqueous fluid containing a dispersed demulsifier is dosed into and mixed with the emulsion of water and oil immediately after its preparation. Immediately means that the aqueous fluid is mixed with the emulsion without intermediate storage; residence in a transportation or dosage line is not critical for stability and/or performance of the aqueous fluid. Usually the dosage rate of the aqueous fluid containing the dispersed concentrated demulsifier composition to the emulsion of water and oil is between 0.01 and 3.5 wt.-%, preferably between 0.02 and 2 wt.-% and especially between 0.05 and 1 wt.-% as for example between 0.01 and 2 wt.-%, between 0.01 and 1 wt.-%, between 0.02 and 3.5 wt.-%, between 0.02 and 1 wt.-%, between 0.05 and 3.5 wt.-% or between 0.05 wt.-% and 2 wt.-% in respect to the emulsion of water and oil. The larger quantity of the aqueous dispersion of the demulsifier in comparison to the respective concentrated demulsifier composition makes it possible for the demulsifier to be mixed more uniformly with the emulsion. Special mixers may be installed to ensure proper mixing of the dispersed demulsifier with the emulsion of water and oil. Suitable mixers are known to those skilled in the art and include mixing valves, injection quills, injection mixers, kinetic mixers, static mixers and vortex mixers. Often the turbulences induced by rapid flow through tubings and especially through its chokes and bends are sufficient for adequate mixing of the demulsifier with the emulsion of water and oil. This is especially valid for down-the-hole applications.

The amount of concentrated demulsifier according to the invention to be added to the emulsion of water and oil is determined by the resulting concentration of demulsifier (A). The amount of demulsifier (A), as component of the composition according to the invention, to be added to the emulsion of water and oil will vary with the emulsion system to be broken, but in general a sufficient amount of demulsifier (A) calculated on an active basis is in the range of about 1 to 1000 parts per million (ppm) by weight of the emulsion of water and oil, preferably from about 2 to 100 ppm and especially from about 5 to 50 ppm as for example from about 1 to 100 ppm, from about 1 to 500 ppm, from about 2 to 1,000 ppm, from about 2 to 50 ppm, from about 5 to 1,000 ppm or from about 5 to 50 ppm.

The method for resolving an emulsion of water and oil according to the invention is suited for emulsions of water and crude oil and preferably for emulsions containing a crude oil having an API gravity between 10 and 60° and especially for emulsions containing a crude oil having an API gravity between 14° and 30° as for example between 10 and 30° or between 14 and 60°. It is advantageously applicable for the breaking of water-in-oil emulsions. Besides above-ground applications the dispersions according to the invention are especially suited for application down the casing annulus of oil wells where they commingle with the well fluids before their travel up the well tubing and thus can effectively break emulsions and/or prevent the formation of emulsions. Where breaking of emulsions is accomplished at the surface, the dispersion is preferably introduced at or near the well head, allowing it to mix with the emulsion in the flow lines during its transfer to the separator. It can be applied equally for the operation of desalters.

The application of highly concentrated demulsifier compositions according to the invention allows to significantly reduce the logistic effort for chemical demulsifiers in remote locations. As the concentrated demulsifier composition according to the invention is essentially free of water it can be handled, pumped and/or charged even at low temperatures. The viscosity of the concentrated demulsifier composition can be adjusted to the needs by the content of water-miscible organic solvent (D) and/or water-immiscible organic solvent (C). When dispersed in aqueous fluids like seawater, brine or even produced water, which usually is readily available at such locations, the concentrated demulsifier compositions can be applied very easily.

In addition, the use of aqueous fluids like seawater or produced water as carrier for the demulsifier leads to a more effective spreading of the demulsifier at the interface between oil and water and a more efficient reduction of the interfacial tension (IFT). As, Dispersed in water the concentrated demulsifier composition is applied in form of finely distributed droplets with a substantially increased amount of particles available to interact with the boundary phase of a water and crude oil emulsion. The velocity of such small particles is higher than with macroscopic particles and eases the contact with and spreading at the water-oil interphase. The surfactant further supports the transfer of the active material to the interface. Once the IFT is reduced a quick coalescence and as consequence a growth of the water droplet size results in accelerated separation of the water emulsified in the oil. This allows to reduce the dosage rate of the demulsifier and/or to reduce the residence time of the emulsion in the separator in comparison to formulations according to the state of the art.

Within this specification, percentages are weight percentages unless specified otherwise.

EXAMPLES

Preparation of Concentrated Demulsifier Compositions (CD)

The components given in table 1 were weighed into a 250 mL beaker and stirred for 15 minutes at 40° C. to give the concentrated demulsifier compositions CD1 to CD 12. The following demulsifiers (D), surfactants (SF) and water miscible solvents (WS) were used for the preparation of the concentrates:

D1: Oxyalkylated nonyl phenol formaldehyde resin, crosslinked with toluene diisocyanate, containing 25% of aromatic solvent
D2: EO-PO block polymer containing 60 wt.-% propylene glycol
D3: Crosslinked EO/PO block copolymer, esterified with a mixture of alkoxylated tallow fatty amine and dimer fatty acid
D4: Oxyalkylated nonyl phenol/butyl phenol formaldehyde resin
D5: Sodium salt of dodecyl benzyl sulfonic acid
SF1: Polyethoxylated (20) sorbitan partially esterified with oleic acid (HLB value 15)
SF2: Nonyl phenol ethoxylated with 8 mole ethylene oxide (HLB value 12)
SF3: N-Octoyl/decanoyl-N-methyl glucamide (HLB value 13)
SF4: Tall oil fatty acid diethanolammonium salt (HLB value 18)
SF5: Lauryl ether (2EO) sulfate, sodium salt (HLB value approx. 40)
WS1: methanol
WS2: ethanol
WS3: water
WS4: ethylene glycol
WS5: glycerol

TABLE 1

Ingredients of Concentrated demulsifier compositions

| sample | demulsifier (g) | | | surfactant (g) | solvent (g) |
|---|---|---|---|---|---|
| CD1 | D1 (37.5) | D2 (30.7) | D3 (16.4) | SF2 (13.4) | WS2 (8.2) |
| CD2 | D1 (34.8) | D2 (28.4) | D3 (9.4) | SF2 (19.2) | WS2 (8.2) |
| CD3 | D1 (29.7) | D2 (24.5) | D3 (35.6) | SF1 (2.0) | WS2 (8.2) |
| CD4 | D1 (48.3) | D2 (41.5) | — | SF3 (2.0) | WS2 (8.2) |
| CD5 | D1 (46.4) | D2 (39.9) | — | SF3 (7.5) | WS1 (6.2) |
| CD6 | D3 (84.8) | — | — | SF4 (9.8) | WS1 (5.4) |
| CD7 | D4 (58.0) | — | — | SF3 (4.8) | WS2 (37.2) |
| CD8 | D1 (75.6) | — | — | SF5 (7.4) | WS4 (17.0) |
| CD9 | D2 (17.0) | D4 (70.5) | — | SF3 (6.5) | WS5 (6.0) |
| CD10 (comp.) | D1 (48.3) | D2 (41.5) | — | — | WS2 (10.2) |
| CD11 (comp.) | D1 (24.1) | D2 (20.7) | — | SF3 (3.0) | WS2 (4.1) WS3 (49.1) |
| CD12 (comp.) | D1 (13.3) | D2 (26.0) | — | — | WS2 (27.8) WS3 (34.2) |
| CD13 (comp.) | D2 (69.0) | D5 (1.0) | — | SF3 (3.0) | WS3 (27.0) |
| CD14 | D2 (69.0) | D5 (1.0) | — | SF3 (3.0) | WS2 (25) WS3 (2) |
| CD15 (comp.) | D2 (25.0) | D5 (1.0) | — | SF3 (3.0) | WS3 (71.0) |

(comp.) = comparative example, not according to the invention

Preparation of Dispersed Demulsifiers (DD)

In order to evaluate the efficiency of the concentrated demulsifier compositions dispersed in an aqueous fluid the concentrated demulsifier compositions were dispersed in different grades and amounts of water as given in table 2. An aliquot of the concentrated demulsifier composition (CD) and water were dosed into a 250 mL glass beaker equipped with an Ultra-Turrax® and stirred at 5,000 rpm for 2 min. This resulted in slightly turbid dispersions. The particle size of the dispersions was determined by dynamic light scattering immediately after the preparation and after six hours standing at ambient. Appearance of the dispersions was checked visually after 6 hours of standing at ambient. The results are summarized in table 2.

TABLE 2

Composition and characterization of dispersed demulsifiers

| | | | particle size [pm] | | appearance |
|---|---|---|---|---|---|
| sample | CD (g) | aqueous phase (g) | immediately | @6 hours | @6 hours |
| DD1 | CD1 (2.5) | seawater (97.5) | 0.22 | 0.30 | homogeneous |
| DD2 | CD2 (2.5) | seawater (97.5) | 0.25 | 0.36 | homogeneous |
| DD3 | CD3 (2.5) | seawater (97.5) | 0.49 | 10.5 | Homogeneous |
| DD4 | CD4 (2.5) | seawater (97.5) | 0.28 | 11.4 | homogeneous |
| DD5 | CD5 (2.5) | seawater (97.5) | 0.33 | 11.6 | homogeneous |

TABLE 2-continued

Composition and characterization of dispersed demulsifiers

| sample | CD (g) | aqueous phase (g) | particle size [pm] immediately | @6 hours | appearance @6 hours |
|---|---|---|---|---|---|
| DD6 | CD6 (2.5) | seawater (97.5) | 0.37 | 7.1 | homogeneous |
| DD7 | CD7 (2.5) | seawater (97.5) | 0.41 | 8.9 | homogeneous |
| DD8 | CD8 (2.5) | tap water (97.5) | 0.40 | 12.0 | homogeneous |
| DD9 | CD9 (2.5) | prod. water (97.5) | 1.62 | 3.5 | homogeneous |
| DD10 | CD4 (5.0) | seawater (95.0) | 1.37 | 15.6 | homogeneous |
| DD11 | CD8 (5.0) | seawater (95.0) | 0.82 | 12.0 | homogeneous |
| DD12 | CD4 (1.5) | seawater (98.5) | 0.38 | 9.2 | homogeneous |
| DD13 | CD4 (0.5) | tap water (99.5) | 0.32 | 1.20 | homogeneous |
| DD14 (comp.) | CD10 (2.5) | seawater (97.5) | 53 | n. d. | creaming |
| DD15 (comp.) | CD11 (6.5) | seawater (93.5) | 0.43 | 6.3 | homogeneous |
| DD16 (comp.) | CD12 (1.5) | seawater (98.5) | 34 | n. d. | creaming |
| DD17 (comp.) | CD6 (15.0) | seawater (85.0) | 4.52 | n. d. | creaming |
| DD18 (comp.) | CD13 (3.5) | seawater (96.5) | 45 | n. d. | creaming |
| DD19 | CD14 (3.5) | seawater (96.5) | 0.28 | 4.7 | homogeneous |
| DD20 (comp.) | CD15 (9.2) | seawater (90.8) | 1.45 | 62 | partially creaming | n. d. = not determined;
prod, water = produced water, containing 57 g salt per liter;
(comp.) = comparative example, not according to the invention Bottle Tests, General Procedure For evaluation of the efficiency of the dispersed demulsifiers bottle tests were made. In these tests 100 ml of an emulsion of water and oil were filled into a conical glass cylinder (120 ml volume) and heated to 40° C. resp. 60° C. in a thermostated bath. After equilibration in the water bath (at least 10 minutes) the dispersed demulsifiers (DD) freshly prepared according to the method described above were added to the emulsion of water and oil with the aid of a micropipette with the dosage rates given in table 3. After sealing the bottles were vigorously shaken in vertical direction for 1 minute. Subsequently the bottles were placed in the thermostated bath and time started to count. Readings of water drop out were taken visually with the aid of a flashlight at the following times: 2, 5, 8, 10, 15, 20, 25, 30, 40 and 60 minutes. After standing for 10 minutes, the bottles were taken from the bath to perform 10 decent movements. After this, the bottles were replaced to the bath, with no interruption until the end of the experiment. The bottle tests were made with two crude oils with API gravity of 24° and a basic sediment and water (BS&W) content of 56 vol.-% respectively an API gravity of 18° and a BS&W content of 64 vol.-%. Both water-in-oil emulsions had an electrical conductivity of 0.5 µS. The volume of water separated from the emulsion was measured in intervals from 2 until 60 minutes and noted in table 3. For better discrimination of the results the sum the volumes of water separated at the different times was calculated. A high sum of the volumes separated is an indicator for a good performance of the demulsifier.

TABLE 3

Measurement of water separation by using dispersed demulsifiers (DD) in a crude oil with API 24° and BS&W of 56 vol.-% at a temperature of 60° C.

| | | Volume of water separated (in min) | | | | | | | | | |
|---|---|---|---|---|---|---|---|---|---|---|---|
| example | dosage | 2' | 5' | 8' | 10' | 15' | 20' | 25' | 30' | 40' | 60' Σ |
| 1 | blank | 0 | 0 | 0 | 1 | 1 | 3 | 5 | 8 | 9 | 12 39 |
| 2 | 0.40 vol.-% DD1 | 3 | 12 | 24 | 36 | 45 | 50 | 52 | 53 | 54 | 55384 |

TABLE 3-continued

Measurement of water separation by using dispersed demulsifiers (DD) in a crude oil with API 24° and BS&W of 56 vol.-% at a temperature of 60° C.

| | | Volume of water separated (in min) | | | | | | | | | |
|---|---|---|---|---|---|---|---|---|---|---|---|
| example | dosage | 2' | 5' | 8' | 10' | 15' | 20' | 25' | 30' | 40' | 60' Σ |
| 3 | 0.40 vol.-% DD2 | 1 | 8 | 14 | 21 | 30 | 35 | 43 | 50 | 52 | 55309 |
| 4 | 0.40 vol.-% DD3 | 1 | 16 | 36 | 52 | 52 | 54 | 55 | 56 | 56 | 56434 |
| 5 | 0.40 vol.-% DD4 | 6 | 38 | 54 | 55 | 55 | 56 | 56 | 56 | 56 | 56488 |
| 6 | 0.40 vol.-% DD5 | 1 | 31 | 52 | 54 | 55 | 56 | 56 | 56 | 56 | 56473 |
| 7 | 0.40 vol.-% DD6 | 0 | 14 | 32 | 48 | 52 | 54 | 55 | 56 | 56 | 56423 |
| 8 | 0.40 vol.-% DD7 | 1 | 6 | 13 | 19 | 27 | 37 | 43 | 50 | 55 | 56307 |
| 9 | 0.40 vol.-% DD8 | 5 | 32 | 48 | 53 | 54 | 55 | 56 | 56 | 56 | 56471 |
| 10 | 0.40 vol.-% DD9 | 1 | 5 | 10 | 19 | 27 | 35 | 42 | 50 | 53 | 55297 |
| 11 | 0.67 vol.-% DD10 | 4 | 29 | 43 | 50 | 53 | 55 | 56 | 56 | 56 | 56458 |
| 12 (comp.) | 0.40 vol.-% DD15 | 2 | 6 | 8 | 12 | 18 | 25 | 32 | 38 | 46 | 52239 |
| 13 (comp.) | 0.01 vol.-% CD4 | 1 | 3 | 4 | 6 | 9 | 12 | 16 | 19 | 23 | 26119 |
| 14 | 0.01 vol.-% DD19 | 3 | 5 | 20 | 32 | 41 | 49 | 56 | 56 | 56 | 56374 |

(comp.) = comparative example, not according to the invention

In further series of water separation tests the amount of the dispersed demulsifiers (DD) added to a crude oil emulsion was varied and compared with the performance of the respective concentrated demulsifier compositions (CD). Furthermore the minimum dosage rate to achieve satisfactory demulsification was determined. The performance was checked with bottle tests according to the above procedure in a crude oil with sediment and water (BS&W) content of 64 vol.-% and 18° API.

Table 4, below shows the results obtained at 60° C. and table 5 shows the results obtained at 40° C.

TABLE 4

Measurement of water separation upon addition of dispersed demulsifier (DD) to a crude oil with API 18° and BS&W of 64 vol.-% at a temperature of 60° C.

| example | demulsifier | dosage (vol.-ppm) | 2' | 5' | 8' | 10' | 15' | 20' | 25' | 30' | 40' | 60' | Σ |
|---|---|---|---|---|---|---|---|---|---|---|---|---|---|
| 15 (comp.) | blank | — | 0 | 0 | 0 | 0 | 0 | 0 | 0 | 0 | 0 | 0 | 0 |
| 16 | DD4 | 4,000 | 24 | 64 | 64 | 64 | 64 | 64 | 64 | 64 | 64 | 64 | 600 |
| 17 | DD4 | 3,000 | 15 | 54 | 64 | 64 | 64 | 64 | 64 | 64 | 64 | 64 | 581 |
| 18 | DD4 | 2,000 | 4 | 30 | 48 | 62 | 64 | 64 | 64 | 64 | 64 | 64 | 528 |
| 19 | DD4 | 1,000 | 0 | 0 | 0.5 | 8 | 20 | 54 | 56 | 60 | 62 | 62 | 322 |
| 20 (comp.) | CD4 | 100 | 2 | 12 | 22 | 51 | 56 | 64 | 64 | 64 | 64 | 64 | 463 |
| 21 (comp.) | CD4 | 50 | 0 | 0 | 0 | 1 | 2 | 8 | 26 | 48 | 57 | 62 | 204 |
| 22 (comp.) | DD15 | 2,000 | 0 | 0 | 0 | 0 | 1 | 6 | 23 | 40 | 56 | 64 | 190 |
| 23 | DD8 | 3,000 | 12 | 43 | 61 | 64 | 64 | 64 | 64 | 64 | 64 | 64 | 564 |
| 24 | DD8 | 2,000 | 3 | 22 | 37 | 54 | 63 | 64 | 64 | 64 | 64 | 64 | 499 |
| 25 | DD8 | 1,000 | 0 | 0 | 0 | 5 | 13 | 39 | 51 | 59 | 63 | 64 | 294 |
| 26 (comp.) | CD8 | 100 | 3 | 12 | 26 | 34 | 46 | 59 | 61 | 63 | 64 | 64 | 432 |
| 27 | DD19 | 1,000 | 10 | 15 | 21 | 32 | 39 | 46 | 51 | 58 | 62 | 62 | 396 |

(comp.) = comparative example, not according to the invention

TABLE 5

Measurement of water separation upon addition of dispersed demulsifier (DD) to a crude oil with API 18° and BSW of 64 vol.-% at a temperature of 40° C.

| example | demulsifier | dosage (vol.-ppm) | 2' | 5' | 8' | 10' | 15' | 20' | 25' | 30' | 40' | 60' | Σ |
|---|---|---|---|---|---|---|---|---|---|---|---|---|---|
| 28 (comp.) | blank | — | 0 | 0 | 0 | 0 | 0 | 0 | 0 | 0 | 0 | 0 | 0 |
| 29 | DD4 | 4,000 | 8 | 26 | 38 | 41 | 46 | 58 | 63 | 64 | 64 | 64 | 472 |
| 30 | DD4 | 3,000 | 4 | 16 | 27 | 29 | 31 | 36 | 40 | 46 | 52 | 58 | 339 |
| 31 | DD4 | 2,000 | 0 | 0 | 3 | 6 | 15 | 20 | 26 | 34 | 56 | 56 | 216 |
| 32 (comp.) | CD4 | 100 | 0 | 0 | 0 | 0 | 0 | 0 | 3 | 4 | 8 | 8 | 23 |
| 33 (comp.) | DD15 | 2,000 | 0 | 0 | 1 | 5 | 9 | 18 | 25 | 35 | 44 | 55 | 192 |
| 34 | DD8 | 3,000 | 5 | 19 | 29 | 33 | 39 | 44 | 49 | 52 | 56 | 60 | 386 |
| 35 | DD8 | 2,000 | 0 | 0 | 5 | 9 | 15 | 18 | 29 | 41 | 56 | 58 | 231 |
| 36 (comp.) | CD8 | 100 | 0 | 0 | 0 | 0 | 1 | 2 | 5 | 7 | 11 | 15 | 41 |

(comp.) = comparative example, not according to the invention

In further bottle tests the oil and water phases were separated after the test. The crude oil used had an API gravity of 18° and a BS&W content of 64 vol.-%. In the separated oil phase BS&W content was determined by Karl Fischer analysis and NaCl content was determined according to ASTM D3230-13. In the water phase the content of oil and grease was determined according to EPA Method 1664 Revision B. The results are summarized in table 6.

TABLE 6

Analysis of different oil and water phases after treatment of the emulsion with dispersed demulsifiers and phase separation

| example | demulsifier (vol.-ppm) | oil phase BS&W (vol.-%) | oil phase NaCl (wt.-ppm) | oil & grease in water (vol.-ppm) |
|---|---|---|---|---|
| 37 | DD4 (1600) | 0.01 | 5 | 18 |
| 38 | DD4 (1000) | 0.10 | 53 | 13 |
| 39 | DD4 (600) | 0.11 | 58 | 14 |
| 40 (comp.) | CD11 (50) | 0.80 | 420 | 22 |
| 41 (comp.) | CD4 (50) | 0.60 | 350 | 25 |
| 42 (comp.) | DD15 (1000) | 0.38 | 310 | 23 |
| 43 | DD19 (1000) | 0.11 | 50 | 12 |

(comp.) = comparative example, not according to the invention

The results of examples 1 to 43 show that dispersion of the concentrated demulsifier compositions increases their efficiency of separation. For example, as can be seen in table 4 at 60° C. a dosage of 2.000 ppm of dispersed demulsifier DD4, containing 50 ppm of concentrated demulsifier composition CD4 gave a performance comparable to the concentrated demulsifier composition at a dosage rate of 100 ppm. At 40° C. (table 5) 2,000 ppm of DD4, containing 50 ppm of the concentrate, shows a performance significantly superior to the concentrate at 100 ppm. Furthermore, the results of tables 4 and 5 additionally show that especially at lower temperatures the dispersed demulsifier gives more efficient separation than the concentrated demulsifier composition.

The results of table 6 show that the oil phase obtained after treatment of water and oil emulsions with the dispersed demulsifiers according to the invention has lower residual BS&W and salt content than with the respective concentrated demulsifier compositions. Additionally the water phase contains less residual oil and grease which facilitates its disposal.

The invention claimed is:

1. A process for breaking of an emulsion of oil and water comprising
   i) in-situ preparation of an aqueous dispersion of a concentrated demulsifier composition comprising
      A) at least 50 wt.-% of a demulsifier, or of a mixture of the demulsifier with an alkyl aryl sulphonic acid or a salt of the alkyl aryl sulphonic acid,
      B) 0.1 to 20 wt.-% of a surfactant selected form anionic, cationic, zwitterionic and nonionic surfactants, the surfactant having a HLB value of 7 or more and being different from the demulsifier,
      C) less than 20 wt.-% of a water-immiscible organic solvent,
      D) 3 to 49 wt.-% of a water-miscible organic solvent and
      E) 0 to 5 wt.-% water,
      wherein the demulsifier is selected from the group consisting of polyoxyalkylated alkyl phenols, polyoxyalkylated alkyl phenol resins, polyoxyalkylated alkanols, polyoxyalkylated polyols, polyoxyalkylated alkyl amines, polyoxyalkylated polymeric amines, polyglycol resin esters and polyoxyalkylated glycol esters, optionally being crosslinked with aldehydes, diglycidyl ethers, di-isocyanates and/or polycarboxylic acids and combinations thereof, in an aqueous fluid and
   ii) mixing the aqueous dispersion with an emulsion of oil and water in a mixer with an outlet,
      wherein the aqueous dispersion contains 0.1 to 7 wt.-% of the concentrated demulsifier composition.

2. The process according to claim 1, wherein the aqueous fluid is selected from the group consisting of fresh water, brine, brackish water, saline water, sea water and produced water.

3. The process according to claim 1, wherein the preparation of the dispersion is performed in a continuous mode.

4. The process according to claim 1, wherein the preparation of the dispersion is performed with a dynamic mixer.

5. The process according to claim 4, wherein the dynamic mixer is selected from the group consisting of high shear mixer equipment, high-pressure homogenizers, high shear homogenizers and microjet reactors.

6. The process according to claim 1, wherein the preparation of the dispersion is performed with a static mixer.

7. The process as claimed in claim 6, wherein a helical mixer having helical element groups consisting of from 2 to 200 mixing elements is used.

8. The process as claimed in claim 6, wherein the mixer has a relative mixer length L/D of from 2 to 50, where L is the length and D is the diameter of the mixing zone.

9. The process as claimed in claim 6, wherein the pressure drop over the mixing zone is less than 10 bar.

10. The process according to claim 1, wherein the temperature at the outlet of the mixer is between 25 and 90° C.

11. The process according to claim 1, wherein the mixing time is less than 60 s.

12. The process according to claim 1, wherein the mean particle size of the aqueous dispersion is below 50 μm.

13. The process according to claim 1, comprising the steps of:
   a) continuously dosing 0.1 to 7 wt.-% of the concentrated demulsifier composition into a stream of aqueous fluid,
   b) in-line mixing of the stream containing the concentrated demulsifier composition and the aqueous fluid downstream from the point of addition of the concentrated demulsifier composition to obtain a dispersion of the demulsifier in the aqueous fluid,
   c) mixing the stream of aqueous fluid containing the dispersed demulsifier with an emulsion of water and oil,
   d) coalescing water droplets from the emulsion and
   e) separating the oil phase from the water phase.

14. The process according to claim 13, wherein the stream of aqueous fluid containing the dispersed demulsifier is added to the emulsion of water and oil between a wellhead and a separator.

15. The process according to claim 13, wherein mixing of the stream of aqueous fluid containing the dispersed demulsifier with an emulsion of water and oil is carried out downhole at a casing annulus of an oil well.

16. The process according to claim 1, wherein the emulsion of water and oil is a water-in-oil emulsion or contains a water-in-oil emulsion.

17. The process according to claim 1, wherein the process is performed in a continuous mode.

18. The process as claimed in claim 1, wherein the amount of aqueous fluid containing the dispersed demulsifier added to the emulsion of water and oil is between 0.01 and 3.5 wt.-% in respect to the emulsion of water and oil.

19. An aqueous dispersion of a concentrated demulsifier composition, comprising 0.1 to 7 wt.-% of the concentrated demulsifier composition, wherein the concentrated demulsifier composition comprises
   A) at least 65 wt.-% of a demulsifier or of a mixture of the demulsifier with an alkyl aryl sulphonic acid or a salt of the alkyl aryl sulphonic acid,
   B) 0.1 to 20 wt.-% of a surfactant selected from the group consisting of anionic, cationic, zwitterionic and nonionic surfactants, the surfactant having a HLB value of 7 or more and being different from the demulsifier,
   C) less than 20 wt.-% of a water-immiscible organic solvent,
   D) 3 to 34 wt.-% of a water-miscible organic solvent and
   E) 0 to 5 wt.-% water,
   wherein the demulsifier A) is selected from the group consisting of polyoxyalkylated alkyl phenols, polyoxyalkylated alkyl phenol resins, polyoxyalkylated alkanols, polyoxyalkylated polyols, polyoxyalkylated alkyl amines, polyoxyalkylated polymeric amines, polyglycol resin esters and polyoxyalkylated glycol esters, optionally being crosslinked with aldehydes, diglycidyl ethers, di-isocyanates and/or polycarboxylic acids and combinations thereof,
   in an aqueous fluid.

20. The aqueous dispersion according to claim 19, wherein the aqueous fluid is selected from the group consisting of fresh water, brine, brackish water, saline water, sea water and produced water.

21. The aqueous dispersion according to claim 19, wherein the mean particle size of the aqueous dispersion is below 50 μm.

22. A concentrated demulsifier composition comprising
A) at least 65 wt.-% of a demulsifier or of a mixture of the demulsifier with an alkyl aryl sulphonic acid or a salt of the alkyl aryl sulphonic acid,
B) 0.1 to 20 wt.-% of a surfactant selected from the group consisting of anionic, cationic, zwitterionic and nonionic surfactants, the surfactant having a HLB value of 7 or more and being different from the demulsifier,
C) less than 20 wt.-% of a water-immiscible organic solvent,
D) 3 to 34 wt.-% of a water-miscible organic solvent and
E) 0 to 5 wt.-% water,
wherein the demulsifier is selected from the group consisting of polyoxyalkylated alkyl phenols, polyoxyalkylated alkyl phenol resins, polyoxyalkylated alkanols, polyoxyalkylated polyols, polyoxyalkylated alkyl amines, polyoxyalkylated polymeric amines, polyglycol resin esters and polyoxyalkylated glycol esters, optionally being crosslinked with aldehydes, diglycidyl ethers, di-isocyanates and/or polycarboxylic acids and combinations thereof, wherein the surfactant (B) is a N-acylated N-methyl glucamide.

23. A concentrated demulsifier composition, comprising
A) at least 65 wt.-% of a demulsifier or of a mixture of the demulsifier with an alkyl aryl sulphonic acid or a salt of the alkyl aryl sulphonic acid,
B) 0.1 to 20 wt.-% of a surfactant selected from the group consisting of anionic, cationic, zwitterionic and nonionic surfactants, the surfactant having a HLB value of 7 or more and being different from the demulsifier,
C) 0.1 to 20 wt.-% of a water-immiscible organic solvent,
D) 3 to 34 wt.-% of a water-miscible organic solvent and
E) 0 to 5 wt.-% water,
wherein the demulsifier is selected from the group consisting of polyoxyalkylated alkyl phenols, polyoxyalkylated alkyl phenol resins, polyoxyalkylated alkanols, polyoxyalkylated polyols, polyoxyalkylated alkyl amines, polyoxyalkylated polymeric amines, polyglycol resin esters and polyoxyalkylated glycol esters, optionally being crosslinked with aldehydes, diglycidyl ethers, di-isocyanates and/or polycarboxylic acids and combinations thereof.

* * * * *